(12) United States Patent
Tanaka et al.

(10) Patent No.: US 12,530,035 B2
(45) Date of Patent: Jan. 20, 2026

(54) TRAVEL CONTROL SYSTEM, CONTROL METHOD, AND CONTROL DEVICE

(71) Applicant: Rakuten Group, Inc., Tokyo (JP)

(72) Inventors: Daiki Tanaka, Tokyo (JP); Takayoshi Inuma, Tokyo (JP); Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/540,934

(22) Filed: Dec. 2, 2021

(65) Prior Publication Data

US 2022/0197314 A1 Jun. 23, 2022

(30) Foreign Application Priority Data

Dec. 18, 2020 (JP) ................. 2020-210427

(51) Int. Cl.
*G05D 1/00* (2024.01)
*B64U 10/13* (2023.01)
*B64U 70/93* (2023.01)
*B64U 80/86* (2023.01)
*B64U 101/30* (2023.01)

(52) U.S. Cl.
CPC ............ *G05D 1/106* (2019.05); *B64U 70/93* (2023.01); *G05D 1/0217* (2013.01); *G05D 1/0238* (2013.01); *B64U 10/13* (2023.01); *B64U 80/86* (2023.01); *B64U 2101/30* (2023.01); *B64U 2201/10* (2023.01)

(58) Field of Classification Search
CPC .... G05D 1/106; G05D 1/0217; G05D 1/0238; B64C 39/024; B64U 2201/10; B64U 80/86; B64U 2101/30
See application file for complete search history.

(56) References Cited

U.S. PATENT DOCUMENTS

| | | | | |
|---|---|---|---|---|
| 2017/0247108 A1* | 8/2017 | Ljubuncic | ............... | G06V 20/17 |
| 2019/0385442 A1* | 12/2019 | Perez Barrera | ........ | G08G 1/005 |
| 2020/0341475 A1* | 10/2020 | Matsuda | ................... | B60P 3/11 |
| 2021/0020057 A1* | 1/2021 | Chen | ......................... | G08G 5/21 |
| 2021/0101617 A1* | 4/2021 | Nakadai | ................. | G08G 1/162 |
| 2021/0181766 A1* | 6/2021 | Geng | ........................ | G08G 5/57 |
| 2021/0374111 A1* | 12/2021 | Harvey | .............. | G01C 21/3837 |

(Continued)

FOREIGN PATENT DOCUMENTS

| | | | | | |
|---|---|---|---|---|---|
| CN | 106292684 A | | 1/2017 | | |
| CN | 110852471 A | * | 2/2020 | ........... | G06Q 10/047 |
| CN | 111121783 A | * | 5/2020 | ............. | G01C 21/20 |

(Continued)

OTHER PUBLICATIONS

Machine translation of the description of Nakadai (WO 2014097368 A1), pp. 6-8 (Year: 2023).*

(Continued)

*Primary Examiner* — Anne Marie Antonucci
*Assistant Examiner* — Jared C Bean
(74) *Attorney, Agent, or Firm* — Sughrue Mion, PLLC

(57) ABSTRACT

The travel control system S causes the UAV 2 to fly away from the UGV 1 on the travel route at a predetermined timing in order to sense the sensing region from the sky. And then, the travel control system S controls travel of the UGV 1 on the basis of sensing data obtained by sensing the sensing region by the UAV 2 having flown away from the UGV 1.

14 Claims, 9 Drawing Sheets

(56) References Cited

U.S. PATENT DOCUMENTS

2022/0238029 A1* 7/2022 Li .................... G05D 1/0202

FOREIGN PATENT DOCUMENTS

| JP | 2018-58656 A | 4/2018 | |
|---|---|---|---|
| JP | 2020-018255 A | 2/2020 | |
| JP | 2020-149640 A | 9/2020 | |
| JP | 2020-180786 A | 11/2020 | |
| JP | 2021-81970 A | 5/2021 | |
| WO | WO-2014097368 A1 * | 6/2014 | ......... G01C 21/3415 |

OTHER PUBLICATIONS

Machine translation of the description of CN 111121783 A, pp. 1-14 (Year: 2023).*
Machine translation of the description of CN 110852471 A, pp. 1-12 (Year: 2023).*

* cited by examiner

TRAVEL CONTROL SYSTEM, CONTROL METHOD, AND CONTROL DEVICE

CROSS REFERENCE TO RELATED APPLICATION

This application claims priority from Japanese Patent Application No. 2020-210427 which was filed on Dec. 18, 2020, the disclosure of which is herein incorporated by reference in its entirety.

TECHNICAL FIELD

One or more embodiments of the present invention relates to a technical field of a control system that controls an unmanned ground vehicle which travels on a route that has been set and an unmanned aerial vehicle which flies in the air.

RELATED ART

Conventionally, an unmanned delivery technique has been studied in which an unmanned ground vehicle travels on a route that has been set to deliver a cargo. Moreover, there has been proposed a system in which an unmanned aerial vehicle which flies over a traveling unmanned ground vehicle travels senses a place away from the unmanned ground vehicle and checks a surrounding situation. For example, JP 2020-18255 A discloses a harvest work system that causes an unmanned aerial vehicle to fly at a position ahead of a combine harvester, images planted grain culms in a farm field with a camera, and detects a fallen state of the planted grain culms from the imaging information.

However, the unmanned aerial vehicle often has a smaller battery capacity than that of the unmanned ground vehicle, and it is difficult for the unmanned aerial vehicle to fly over the unmanned ground vehicle for a long time. Therefore, in a case where an unmanned aerial vehicle is used to support travel of the unmanned ground vehicle as in the conventional technique, there is a issue in terms of power consumption of the unmanned aerial vehicle.

Therefore, one or more embodiments of the present invention are directed to providing a travel control system, a control method, and a control device capable of appropriately controlling travel of an unmanned ground vehicle while suppressing power consumption of an unmanned aerial vehicle used to support travel of the unmanned ground vehicle.

SUMMARY

In response to the above issue, the travel control system includes: an unmanned ground vehicle configured to travel along a route that has been set; an unmanned aerial vehicle mounted on the unmanned ground vehicle; and at least one memory configured to store program code; and at least one processor configured to access the program code and operate as instructed by the program code. The program code includes: first control code configured to cause the at least one processor to make the unmanned aerial vehicle fly away from the unmanned ground vehicle on the route at a predetermined timing in order to sense a region including at least part of the route or another route connected to the route from the sky; and second control code configured to cause the at least one processor to control travel of the unmanned ground vehicle on a basis of sensing data obtained by sensing the region by the unmanned aerial vehicle that has flown away from the unmanned ground vehicle.

The first control code may cause the at least one processor to make the unmanned aerial vehicle fly away from the unmanned ground vehicle at the timing when the unmanned ground vehicle approaches a branch point between the route and the other route.

The first control code may cause the at least one processor to make the unmanned aerial vehicle fly away from the unmanned ground vehicle at the timing when the unmanned ground vehicle approaches a route on which no other ground vehicle has traveled within a past predetermined period from a current time point while the unmanned ground vehicle is traveling on the route.

The program code further may include first determination code configured to cause the at least one processor to determine whether or not map information used for search for the route satisfies a criterion for determining newness of map information, wherein in a case where it is determined that the criterion is not satisfied, the first control code causes the at least one processor to make the unmanned aerial vehicle fly away from the unmanned ground vehicle at the timing.

The first control code may cause the at least one processor to make the unmanned aerial vehicle fly away from the unmanned ground vehicle at the timing when an obstacle is detected in a traveling direction of the unmanned ground vehicle on the route.

The program code further may include second determination code configured to cause the at least one processor to determine whether the unmanned ground vehicle can travel on the route on a basis of the sensing data, wherein the second control code causes the at least one processor to control travel of the unmanned ground vehicle according to a result determined by the at least one processor.

The program code further may include search code configured to cause the at least one processor to search for the other route on which the unmanned ground vehicle can travel on a basis of the sensing data in a case where it is difficult for the unmanned ground vehicle to travel on the route, wherein the second control code causes the at least one processor to control travel of the unmanned ground vehicle according to the other route searched for.

In a case where there is a plurality of the other route on which the unmanned ground vehicle can travel, the search code may cause the at least one processor to determine an optimum route to a destination of the unmanned ground vehicle among the plurality of the other route, and the second control code may cause the at least one processor to control travel of the unmanned ground vehicle according to the determined optimum route.

The program code further may include third control code configured to cause the at least one processor to make the unmanned aerial vehicle that has flown away from the unmanned ground vehicle return to the unmanned ground vehicle.

The control method is executed by one or more computers in the travel control system including the unmanned ground vehicle configured to travel on a route that has been set and the unmanned aerial vehicle mounted on the unmanned ground vehicle. The control method includes: causing the unmanned aerial vehicle to fly away from the unmanned ground vehicle on the route at a predetermined timing in order to sense a region including at least part of the route or another route connected to the route from the sky; and controlling travel of the unmanned ground vehicle on a basis of sensing data obtained by sensing the region by the unmanned aerial vehicle that has flown away from the unmanned ground vehicle.

The control device controls the unmanned ground vehicle configured to travel on a route that has been set and the unmanned aerial vehicle mounted on the unmanned ground vehicle in the travel control system including the unmanned ground vehicle and the unmanned aerial vehicle. The control device includes at least one memory configured to store program code; and at least one processor configured to access the program code and operate as instructed by the program code. The program code includes: first control code configured to cause at least one processor to make the unmanned aerial vehicle fly away from the unmanned ground vehicle on the route at a predetermined timing in order to sense a region including at least part of the route or another route connected to the route from the sky; and second control code configured to cause at least one processor to control travel of the unmanned ground vehicle on a basis of sensing data obtained by sensing the region by the unmanned aerial vehicle that has flown away from the unmanned ground vehicle.

DETAILED DESCRIPTION

Hereinafter, one or more embodiments of the present invention will be described with reference to the drawings.

1. Configuration of Travel Control System 5

Figure 1:
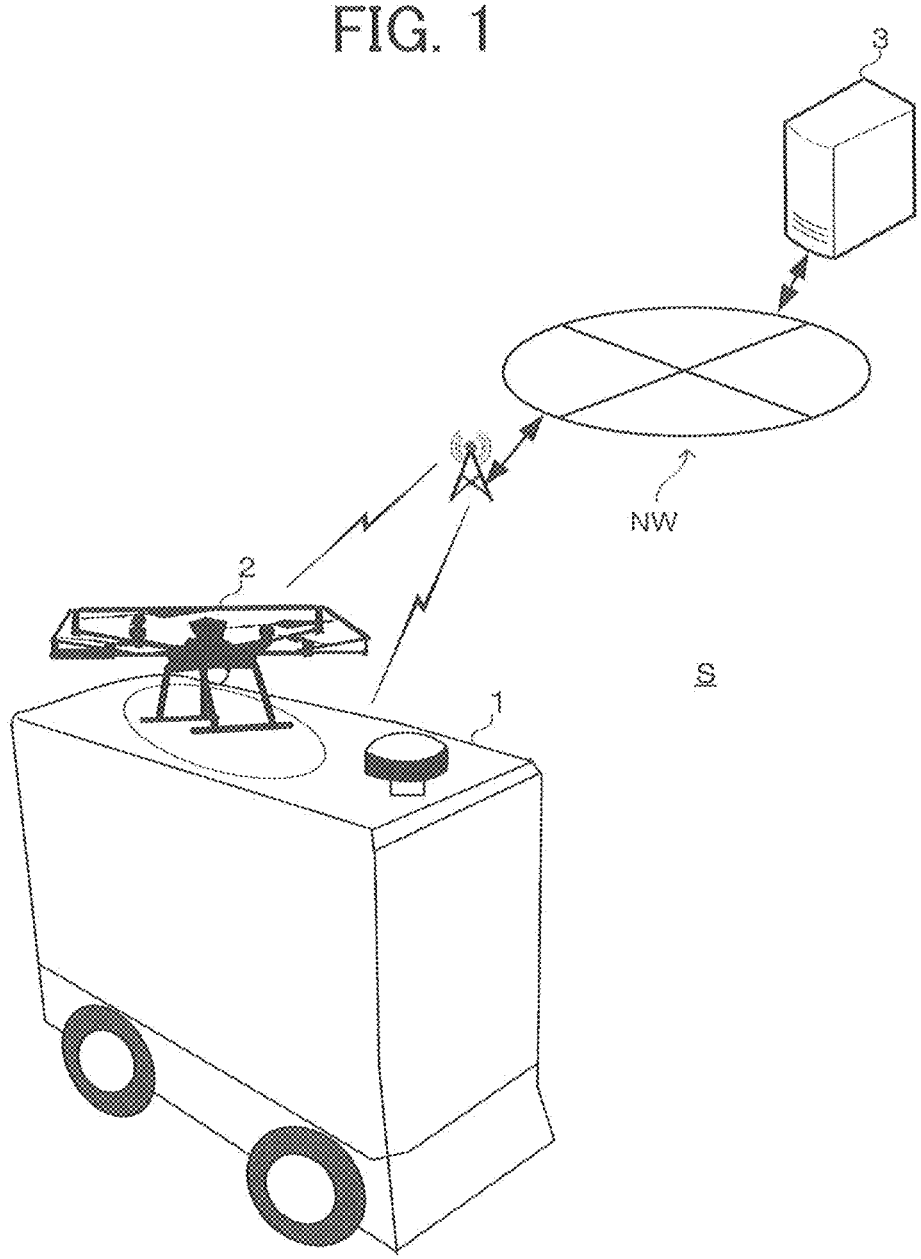
FIG. 1 is a view illustrating a schematic configuration example of a travel control system S.

First, a configuration of a travel control system S according to one or more embodiments of the present invention will be described with reference to FIG. 1. FIG. 1 is a view illustrating a schematic configuration example of the travel control system S. As illustrated in FIG. 1, the travel control system S includes an unmanned ground vehicle (hereinafter referred to as an UGV) 1, an unmanned aerial vehicle (hereinafter referred to as an UAV) 2 mounted on the UGV 1, and a management server 3 (an example of a control device). The UGV 1 and the UAV 2 can communicate with each other via a communication network NW with the management server 3, respectively. The communication network NW includes, for example, the Internet, a mobile body communication network, and a radio base station of the network.

The UGV 1 is an example of an unmanned travel body that travels in an unmanned manner on a route (hereinafter referred to as a "travel route") set for a predetermined purpose. Here, the travel route preferably includes, for example, a road having a road width through which the UGV 1 can pass. Examples of the road include a roadway, a mountain road, and a forest road; however, are not particularly limited, and may be an undeveloped road. Moreover, the travel route may include, in addition to the road, land (for example, land connecting roads) through which the UGV 1 can pass such as a public square. Examples of the predetermined purpose include a purpose of delivering a cargo and a purpose of performing a field investigation. The cargo (article) may be, for example, an ordered item (product) ordered at an EC (Electronic Commerce) website, a home delivery article, relief supplies, or the like. Travel means to move on a road, and is distinguished from flight. Movement means that the current position changes in time series. The UGV 1 may be a vehicle having a plurality of wheels, a robot (for example, a biped walking robot) having no wheels, or the like.

In contrast, the UAV 2 is used to support travel of the UGV 1, is an example of an unmanned flying body that flies in the air in an unmanned manner, and is also called a drone or a multicopter. The UAV 2 can fly according to remote control by an operator from the ground, or fly autonomously. The flight of the UAV 2 may include hovering of the UAV 2. The UAV 2 is managed by a GCS (Ground Control Station). For example, the GCS may be mounted on a pilot terminal operated by an operator as an application, or may include a server such as the management server 3. Incidentally, autonomous flight of the UAV 2 is not limited to autonomous flight by the UAV 2 performing flight control, and the autonomous flight of the UAV 2 may include, for example, autonomous flight by performing flight control as the entire travel control system S.

Moreover, the UAV 2 flies away from the UGV 1 at a predetermined timing, and senses a region (hereinafter referred to as a "sensing region") including at least part of the travel route of the UGV 1 or another route (hereinafter referred to as a "different route") connected to the travel route from the sky (that is from above). Similarly to the travel route, the different route preferably includes a road or the like having a road width through which the UGV 1 can pass. Incidentally, the predetermined timing does not mean a time set in advance, but means an occurrence timing of an event set in advance (details will be described later).

Figure 2:
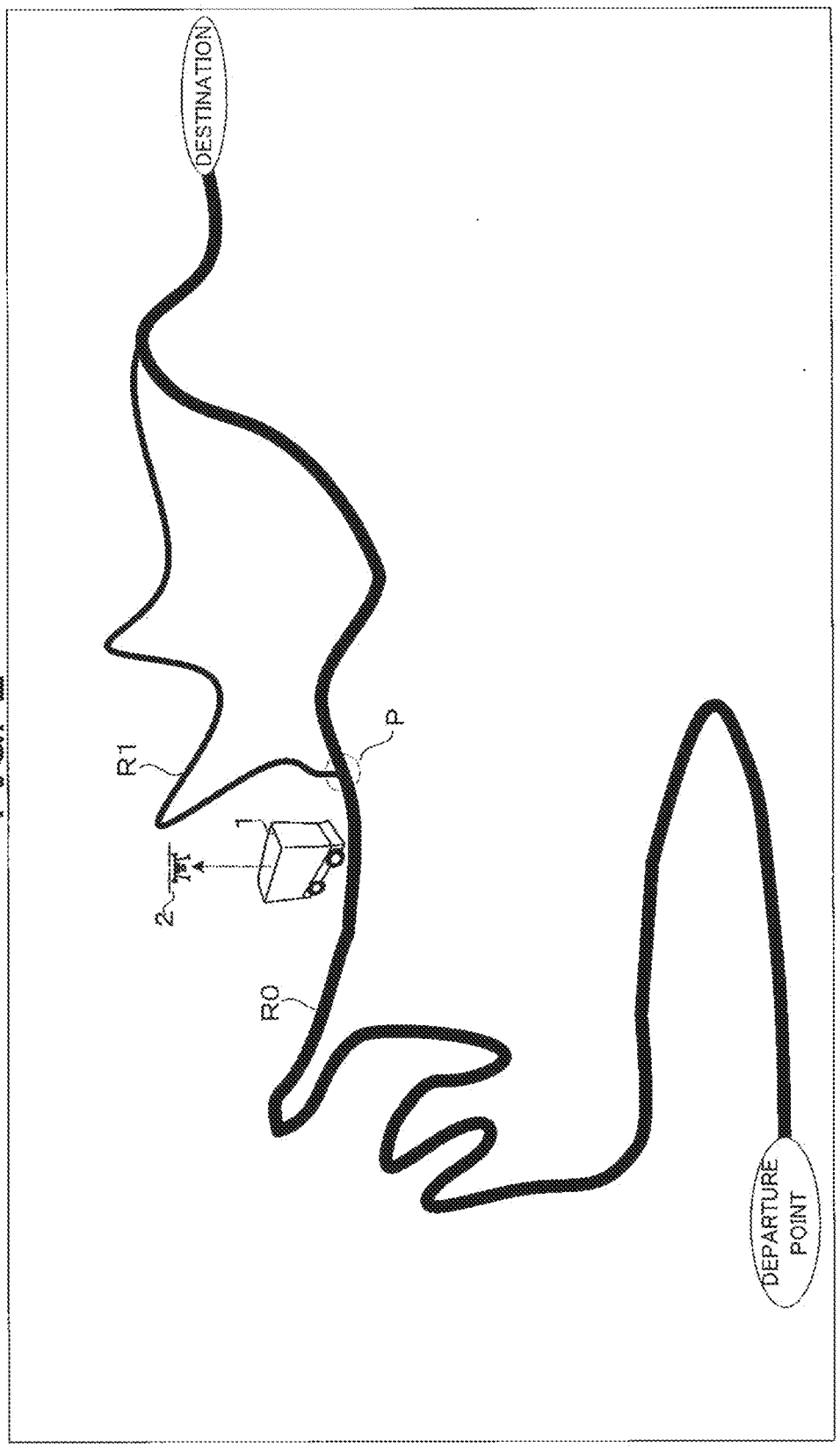
FIG. 2 is a diagram illustrating an example of a travel route and a different route on a map.

FIG. 2 is a diagram illustrating an example of the travel route and the different route on a map. In the example of FIG. 2, the travel route R0 and the different route R1 are connected at a branch point P. In the example of FIG. 2, the sensing region may be a region including entirety of the travel route R0 or a region including part of the travel route R0. Alternatively, the sensing region may be a region including entirety of the different route R1 or a region including part of the different route R1. Alternatively, the sensing region may be a region including entirety of the travel route R0 and the entirety of the different route R1, or may be a region including part of the travel route R0 and part of the different route R1. Incidentally, although the one different route R1 is illustrated in the example of FIG. 2, there is also the travel route with a plurality of different routes. Moreover, although the one branch point P is illustrated in the example of FIG. 2, there is also the travel route in which a plurality of branch points exists.

1-1. Configuration and Function of UGV 1

Figure 3:
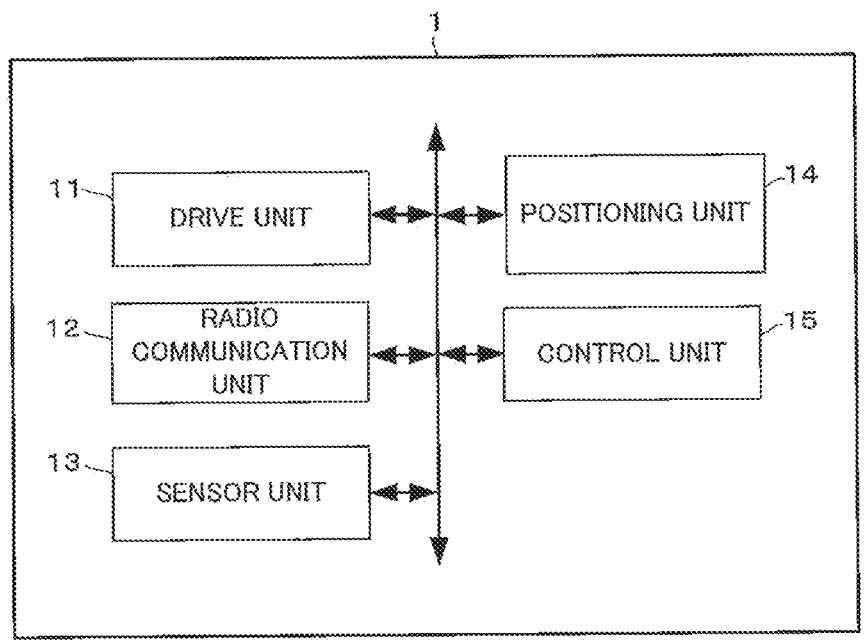
FIG. 3 is a diagram illustrating a schematic configuration example of an UGV 1.

Next, the configuration and function of the UGV 1 will be described with reference to FIG. 3. FIG. 3 is a diagram illustrating a schematic configuration example of the UGV 1. As illustrated in FIG. 3, the UGV 1 includes a drive unit 11, a radio communication unit 12, a sensor unit 13, a positioning unit 14, a control unit 15, and the like. Incidentally, although not illustrated, a battery that supplies power to each unit of the UGV 1 is provided. Furthermore, the UAV 2 can be mounted on the UGV 1. For example, the UAV 2 is mounted by landing on a take-off and landing port provided on a roof of the UGV 1. Moreover, the take-off and landing port may be provided with an opening that can be opened and closed. In this case, the UAV 2 can be stored inside the UGV 1 from the opening of the take-off and landing port. Moreover, the UGV 1 may be capable of storing an article to be delivered. In this case, the UGV 1 includes a storage portion that stores the article and a mechanism for carrying out the article.

The drive unit 11 includes a motor, a rotation shaft, and the like. The drive unit 11 rotates the plurality of wheels by the motor, the rotation shaft, and the like that are driven according to a control signal output from the control unit 15. The radio communication unit 12 controls communication with the management server 3 via a communication network NW. Moreover, the radio communication unit 12 may have a near field communication function such as Bluetooth (registered trademark).

The sensor unit 13 includes various sensors necessary for controlling travel of the UGV 1. The various sensors include, for example, an optical sensor. Detection data detected by the sensor unit 13 is output to the control unit 15. The optical sensor includes, for example, a camera, and is used to sense the surroundings of the UGV 1. By such sensing, it is possible to detect an obstacle that obstructs passage of the UGV 1 in the traveling direction (for example, several to ten meters ahead of the UGV 1) of the UGV 1 on the travel route. Examples of the obstacle include a vehicle stopped on the road, earth and sand deposited on the road, and the like. Moreover, by such sensing, it is also possible to detect the branch point between the travel route and the different route in the traveling direction (for example, several to ten meters ahead of the UGV 1) of the UGV 1 on the travel route. Incidentally, the optical sensor may include LiDAR (Light Detection and Ranging, or Laser Imaging Detection and Ranging).

The positioning unit 14 includes a radio wave receiver and the like. The positioning unit 14 receives, for example, a radio wave transmitted from a satellite of a GNSS (Global Navigation Satellite System) by the radio wave receiver, and detects the current position (latitude and longitude) of the UGV 1 on the basis of the radio wave. Incidentally, the current position of the UGV 1 may be identified by SLAM (Simultaneous Localization And Mapping) processing in addition to the radio wave transmitted from the GNSS satellite. Moreover, the current position of the UGV 1 may be corrected on the basis of the image captured by the optical sensor. Position information indicating the current position detected by the positioning unit 14 is output to the control unit 15.

The control unit 15 includes a CPU (Central Processing Unit), a ROM (Read Only Memory), a RAM (Random Access Memory), a nonvolatile memory, and the like. The control unit 15 executes various controls according to a program (program code group) stored in, for example, the ROM or the nonvolatile memory. Specifically, the control unit 15 performs travel control to cause the UGV 1 to travel to a destination (for example, the delivery destination of the article). In this travel control, rotation speed of the wheels and the position and the traveling direction of the UGV 1 are controlled by using the detection data (for example, image data) acquired from the sensor unit 13, the position information acquired from the positioning unit 14, and travel control information.

Here, the travel control information is acquired from the management server 3, for example, before the UGV 1 starts traveling. The travel control information includes a control command for the UGV 1 to travel toward the destination along the travel route. Such travel control information may include position information of the travel route. The control unit 15 causes the UGV 1 to travel toward the destination along the travel route according to the travel control information. In a case where the sensor unit 13 detects an obstacle, the control unit 15 causes the radio communication unit 12 to transmit obstacle detection information to the management server 3. Such obstacle detection information preferably includes, for example, position information and image data of the obstacle. Moreover, in a case where the sensor unit 13 detects the branch point between the travel route and the different route, the control unit 15 causes the radio communication unit 12 to transmit branch point approach information to the management server 3. The branch point approach information preferably includes, for example, position information of the branch point between the travel route and the different route.

Moreover, the travel control information may be acquired from the management server 3, for example, after the UGV 1 starts traveling. In this case, the travel control information includes a control command for the UGV 1 to travel toward the destination along the different route and position information of the different route. In this case, the control unit 15 causes the UGV 1 to travel toward the destination along the different route according to the travel control information. Alternatively, the travel control information may include a control command for the UGV 1 to come back to the departure point or a transit point. In this case, the control unit 15 causes the UGV 1 to come back to the departure point or the transit point according to the travel control information. Incidentally, the control unit 15 causes the radio communication unit 12 to sequentially transmit the position information and a ground vehicle ID of the UGV 1 to the management server 3. The ground vehicle ID is identification information for identifying the UGV 1.

1-2. Configuration and Function of UAV 2

Figure 4:
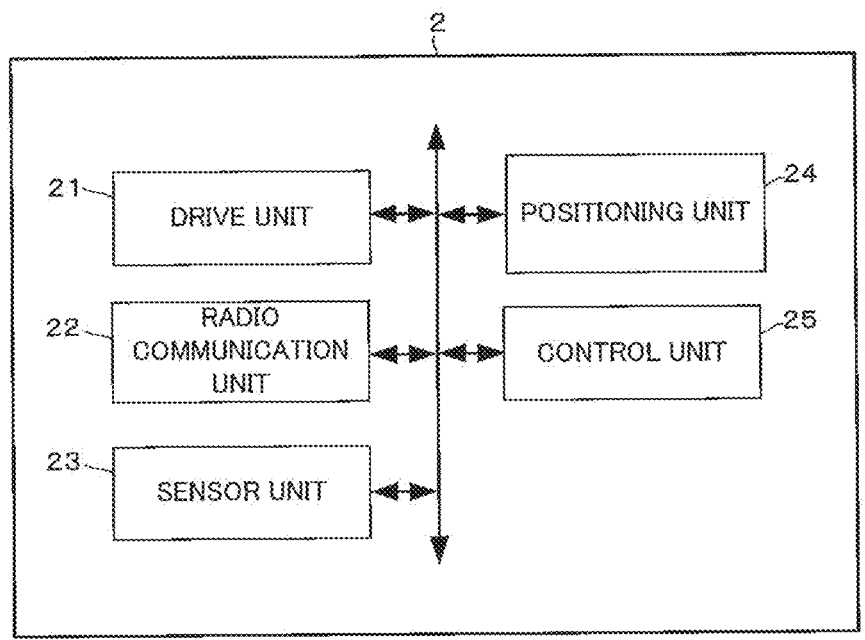
FIG. 4 is a diagram illustrating a schematic configuration example of an UAV 2.

Next, the configuration and function of the UAV 2 will be described with reference to FIG. 4. FIG. 4 is a diagram illustrating a schematic configuration example of the UAV 2. As illustrated in FIG. 4, the UAV 2 includes a drive unit 21, a radio communication unit 22, a sensor unit 23, a positioning unit 24, a control unit 25, and the like. Incidentally, although not illustrated, the UAV 2 includes rotors (propellers) that are horizontal rotary wings, and a battery that supplies power to each unit of the UAV 2.

The drive unit 21 includes motors, rotation shafts, and the like. The drive unit 21 rotates the plurality of rotors by the motors, the rotation shafts, and the like that are driven according to a control signal output from the control unit 25. The radio communication unit 22 controls communication with the management server 3 via the communication network NW. Moreover, the radio communication unit 22 may have a near field communication function such as Bluetooth (registered trademark).

The sensor unit 23 includes various sensors necessary for flight control of the UAV 2. Examples of the various sensors include an optical sensor, a triaxial angular velocity sensor, a triaxial acceleration sensor, and a geomagnetic sensor. Detection data detected by the sensor unit 23 is output to the control unit 25. The optical sensor includes, for example, a camera, and is also used for sensing the sensing region from the sky. Here, sensing from the sky means inspecting (observing) the state (situation) of the earth's surface including the road by capturing an image within a sensible range (for example, a range falling within the angle of view of the camera). Such sensing is performed at least once in the sensing region. Incidentally, the optical sensor may include LiDAR. Moreover, in order to enhance the accuracy of sensing, the sensing may be continuously performed in time series, and the time interval of the sensing may be a constant interval or an indefinite interval.

The positioning unit 24 includes a radio wave receiver, an altitude sensor, and the like. The positioning unit 24 receives, for example, a radio wave transmitted from the GNSS satellite by the radio wave receiver, and detects the current position (latitude and longitude) of the UAV 2 in the horizontal direction on the basis of the radio wave. The current position of the UAV 2 is the flight position of the UAV 2 in flight. Incidentally, the current position of the UAV 2 in the horizontal direction may be corrected on the basis of an image captured by the optical sensor or a radio wave transmitted from a radio base station. Position information indicating the current position detected by the positioning unit 24 is output to the control unit 25. Furthermore, the positioning unit 24 may detect the current position (altitude) of the UAV 2 in the vertical direction by an altitude sensor such as an atmospheric pressure sensor. In this case, the position information includes altitude information indicating the altitude of the UAV 2.

The control unit 25 includes a CPU that is a processor, a ROM, a RAM, a nonvolatile memory, and the like. The control unit 25 executes various controls according to a program (program code group) stored in, for example, the ROM or the nonvolatile memory. Specifically, the control unit 25 performs flight control to cause the UAV 2 to fly. In such flight control, the rotation speed of the rotor and the position, attitude, and traveling direction of the UAV 2 are controlled by using detection data (for example, image data) acquired from the sensor unit 23, the position information acquired from the positioning unit 24, and flight control information.

Here, the flight control information is acquired from, for example, the management server 3, for example, after the UGV 1 starts traveling. The flight control information includes a control command for the UAV 2 to fly away from the UGV 1 in order to cause the sensing region to be sensed from the sky. Such flight control information may include position information of the sensing region. According to the flight control information, the control unit 25 causes the UAV 2 to fly away (that is, the UAV 2 is caused to take off from the UGV 1) and causes the sensor unit 23 to sense the sensing region from the sky. Then, the control unit 25 causes the radio communication unit 22 to transmit sensing data obtained by sensing the sensing region to the management server 3 (or to the management server 3 via the GCS).

Moreover, the flight control information may be acquired from the management server 3, for example, after the end of sensing of the sensing region. In this case, the flight control information includes a control command for the UAV 2 which has flown away from the UGV 1 to return to the UGV 1. In this case, the control unit 25 causes the UAV 2 to return to the UGV 1 (that is, to land on the UGV 1) according to the flight control information. For example, the control unit 25 causes the UAV 2 to fly to the UGV 1 (that is, to go back to the UGV 1) to cause the UAV 2 to return. Alternatively, the control unit 25 may cause the UAV 2 to fly to the next set merging point to cause the UAV 2 to return. Alternatively, the control unit 25 may cause the UAV 2 to hover (that is, to stand by on the spot) and to return if the UGV 1 approaches within a threshold. Incidentally, the control unit 25 causes the radio communication unit 22 to sequentially transmit the position information of the UAV 2 and remaining battery level information and a aerial vehicle ID of the UAV 2 to the management server 3 (or the management server 3 via the GCS). The aerial vehicle ID is identification information capable of identifying the UAV 2.

1-3. Configuration and Function of Management Server 3

Figure 5:
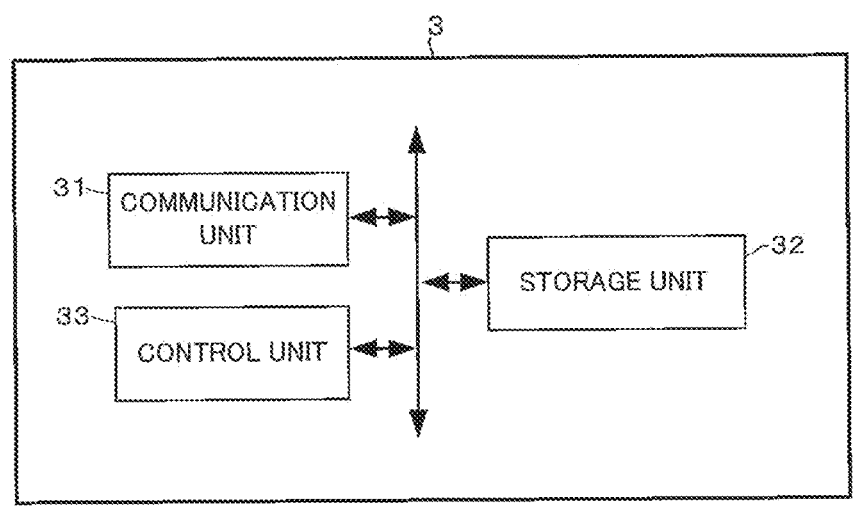
FIG. 5 is a diagram illustrating a schematic configuration example of a management server 3.
Figure 6:
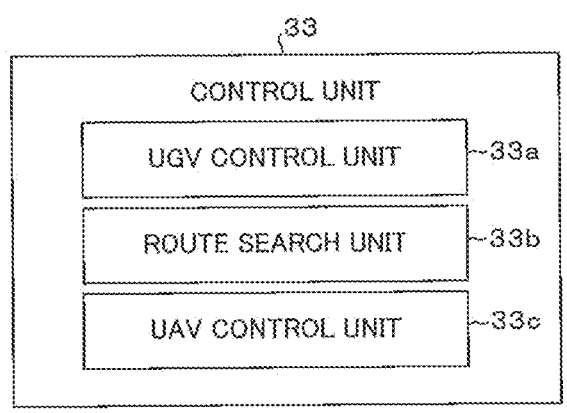
FIG. 6 is a diagram illustrating an example of functional blocks in a control unit 33.

Next, a configuration and a function of the management server 3 will be described with reference to FIGS. 5 and 6. FIG. 5 is a diagram illustrating a schematic configuration example of the management server 3. As illustrated in FIG. 5, the management server 3 includes a communication unit 31, a storage unit 32, a control unit 33, and the like. FIG. 6 is a diagram illustrating an example of functional blocks in the control unit 33.

The communication unit 31 controls communication performed with each of the UGV 1 and the UAV 2 via the communication network NW. The obstacle detection information, the branch point approach information, and the position information and the ground vehicle ID of the UGV 1 that have been transmitted from the UGV 1 are received by the communication unit 31. The management server 3 can recognize the current position of the UGV 1 from the position information of the UGV 1. Moreover, the sensing data, the position information of the UAV 2, and the remaining battery level information and the aerial vehicle ID of the UAV 2 that have been transmitted from the UAV 2 are received by the communication unit 31. The management server 3 can recognize the current position of the UAV 2 from the position information of the UAV 2.

The storage unit 32 includes, for example, a hard disk drive or the like. The storage unit 32 stores map information. The map information represents a map of a predetermined area including the sensing region. The map information includes position information of the road in the predetermined area in addition to position information of a premise, a staircase, and the like in the predetermined area. Moreover, the storage unit 32 stores the update date of map information in association with the map information. Alternatively, the storage unit 32 may store the version number of map information in association with the map information. The version number is a number that changes every time the map information is updated, and indicates newness of the map information.

Furthermore, in map information, travel history information indicating a road on which a ground vehicle such as a UGV has previously traveled and a travel date and time may be stored in association with the map information. Moreover, the storage unit 32 may store width information indicating the width (width in the direction orthogonal to the traveling direction) of the UGV 1 or type information that can identify (specify) the width in association with the ground vehicle ID of the UGV 1. Examples of the type information include the model of the UGV 1. The width information and the type information are preferably used to determine whether the UGV 1 can pass through a narrow road in particular.

The control unit 33 includes at least one CPU that is a processor, a ROM, a RAM, a nonvolatile memory, and the like. The ROM or the non-volatile memory is configured to store a program (program code). The CPU is configured to access the program code and operate as instructed by the program code. The program code includes: first control code configured to cause the CPU to make the UAV 2 fly away from the UGV 1 on the route at a predetermined timing in order to sense the sensing region including at least part of the travel route or the different route from the sky; and second control code configured to cause the CPU to control travel of the UGV 1 on the basis of sensing data obtained by sensing the sensing region by the UAV 2 that has flown away from the UGV 1. The program code may further include first determination code configured to cause the CPU to determine whether or not map information used for search for the route satisfies a criterion for determining newness of the map information. The program code may further include second determination code configured to cause the CPU to determine whether the UGV 1 can travel on the route on the basis of the sensing data. The program code may further include search code configured to cause the CPU to search for the different route on which the UGV 1 can travel on the basis of the sensing data in a case where it is difficult for the UGV 1 to travel on the route. The program code may further include third control code configured to cause the CPU to make the UAV 2 that has flown away from the UGV 1 return to the UGV 1.

As illustrated in FIG. 6, the control unit 33 functions as a UGV control unit 33a, a route search unit 33b, a UAV control unit 33c, and the like according to the program (program code group) stored in, for example, the ROM or the nonvolatile memory.

The UGV control unit 33a controls travel of the UGV 1 by transmitting to the UGV 1 travel control information including a control command for the UGV 1 to travel. That is, the UGV control unit 33a causes the UGV 1 to travel toward the destination along the travel route that has been set. Here, the travel route may be set by an administrator or the like according to the travel purpose of the UGV 1, or may be set (determined) by being searched for by the route search unit 33b. For example, the route search unit 33b searches for a route from the departure point to the destination of the UGV 1, the route including a road having a road width through which the UGV 1 can pass, on the basis of the road or the like indicated in the map information stored in the storage unit 32, and determines the route that has been searched for to be the travel route. In determining such travel route, a road having a road width equal to or larger than the width of the UGV 1 identified by the width information or the type information of the UGV 1 is preferably selected. Moreover, in a case where a plurality of routes has been searched for (that is, in a case where there is a plurality of routes on which the UGV 1 can travel), the route search unit 33b may determine the optimum route (for example, the route with the shortest distance or the route with the shortest time required) to the destination of the UGV 1 among the plurality of routes to be the travel route. Incidentally, a route other than the route determined to be the travel route among the plurality of routes that has been searched for may be stored as a preliminary route.

The UAV control unit 33c controls flight of the UAV 2 by transmitting to the UAV 2 flight control information including a control command for the UAV 2 to fly away from the UGV 1. That is, the UAV control unit 33c causes the UAV 2 to fly away from the UGV 1 on the travel route at a predetermined timing in order to sense the sensing region from the sky. For example, the UAV control unit 33c causes the UAV 2 to fly away from the UGV 1 at a timing when the UGV 1 approaches the branch point between the travel route and the different route. As a result, by causing the UAV 2 to sense the sensing region including the travel route, it is possible to check the safety of the planned travel route on and after the branch point in a timely manner. Here, whether the UGV 1 has approached the branch point may be determined on the basis of whether the branch point approach information from the UGV 1 has been received by the communication unit 31. Alternatively, it may be determined whether or not the UGV 1 has approached the branch point indicated by map information stored in the storage unit 32 (for example, whether the distance from the UGV 1 to the branch point falls within the range from several meters to several tens of meters) on the basis of the position information of the UGV 1 continuously received by the communication unit 31 and the map information.

As another example, while the UGV 1 is traveling on the travel route (known travel route), the UAV control unit 33c causes the UAV 2 to fly away from the UGV 1 at a timing when the UGV 1 approaches the travel route (untraveled route) on which no other ground vehicle has traveled within a past predetermined period from the current time point. Here, whether the UGV 1 has approached the travel route on which no other ground vehicle has traveled is determined on the basis of, for example, whether the UGV 1 has approached a start point of the untraveled route indicated in map information stored in the storage unit 32 (for example, whether the distance from the UGV 1 to the start point falls within the range from several meters to several tens of meters) on the basis of the position information of the UGV 1 continuously received by the communication unit 31 and the travel history information and the map information stored in the storage unit 32. The travel route on which no other ground vehicle has traveled is, for example, a partial route in the travel route. The other ground vehicle may not be a UGV, and may be, for example, a vehicle driven by a person. Moreover, the predetermined period is preferably a short period of about two weeks to one month, for example. In a case where the UGV 1 travels for the first time on the travel route on which no other ground vehicle has traveled recently, information such as a place under construction and the position of a staircase is not reflected in map information used for searching for the travel route, and there is a possibility that it is difficult for the UGV 1 to travel on the travel route in practice. Therefore, by causing the UAV 2 to sense the sensing region including the travel route, it is possible to check whether the UGV 1 can actually travel on the travel route in a timely manner.

However, if map information used for searching for the travel route is new, sensing by the UAV 2 may not be necessary. Therefore, the UAV control unit 33c may determine (judge) whether or not map information used for searching for the travel route satisfies a criterion (a judgment criterion) for newness (that is, for determining newness) of map information, and may cause the UAV 2 to fly away from the UGV 1 at the predetermined timing (for example, the timing of approaching the branch point or the timing of approaching the travel route on which no other ground vehicle has traveled) in a case where it is determined that the criterion is not satisfied. As a result, it is possible to prevent the UAV 2 from flying more than necessary, and thus, it is possible to reduce power consumption of the UAV 2.

Incidentally, for example, an update date (for example, a date within the past one month from the current time point) is set as a criterion for newness of map information. In this case, if the update date of map information used for search for the travel route is the same date as or later than the update date set as the criterion for newness of map information, the UAV control unit 33c determines that the update date of the map information used for search for the travel route satisfies the criterion for newness. Alternatively, for example, a version number may be set as the criterion for newness of map information. In this case, if the version number of the map information used for search for the travel route is newer than the version number set as the criterion for newness of map information, the UAV control unit 33c determines that the update date of the map information used for search for the travel route satisfies the criterion for newness.

As still another example, the UAV control unit 33c may cause the UAV 2 to fly away from the UGV 1 at a timing when an obstacle is detected in the traveling direction of the UGV 1 on the travel route. As a result, by causing the UAV 2 to sense the sensing region including the travel route, for example, in a case where there is an obstacle in a place where the road width is narrow on the travel route, it is possible to check in a timely manner whether travel of the UGV 1 is hindered by the obstacle. Here, whether or not an obstacle has been detected in the traveling direction of the UGV 1 is preferably determined on the basis of whether or not the obstacle detection information from the UGV 1 has been received by the communication unit 31.

Then, when sensing data obtained by sensing the sensing region by the UAV 2 having flown away from the UGV 1 is received by the communication unit 31, the UGV control unit 33a controls travel of the UGV 1 on the basis of the sensing data. That is, the UGV control unit 33a determines (for example, determines by using image analysis) whether the UGV 1 can travel on the travel route (that is, the travel route ahead of the current position) on the basis of the sensing data, and controls travel of the UGV 1 according to the determined result. For example, in a case where there is a place where it is difficult (may be impossible) for the UGV 1 to pass in the travel route appearing in an image included in the sensing data, it is determined that it is difficult (or impossible) for the UGV 1 to travel on the travel route.

Here, the place where it is difficult for the UGV 1 to pass is, for example, a place where the road width is equal to or less than a threshold in the travel route. Such a threshold may be set to the width of the UGV 1, identified by the width information or the type information of the UGV 1. The place where the road width is equal to or less than the threshold may be a place where the road width is temporarily narrowed by an obstacle such as a vehicle (for example, a place where a vehicle is parked at an end of the road such as a road shoulder). Alternatively, the place where it is difficult for the UGV 1 to pass may be a place where there is a soil collapse in the travel route, a place where construction is performed in the travel route, a place where there is a closed fence in the travel route, a place where there is a staircase in the travel route, or the like.

In a case where the UGV control unit 33a determines that it is difficult (or impossible) for the UGV 1 to travel on the travel route, the route search unit 33b searches for the different route (that is, a different route after the branch point) on which the UGV 1 can travel on the basis of the sensing data that has been received and determines the different route that has been searched for. As a result, the travel route on which the UGV 1 travels can be quickly changed, and the time to turn back on the travel route on which the UGV 1 has traveled can be reduced. Incidentally, for example, the different route may be searched for from the preliminary route already searched for and stored at the start of traveling. As a result, the different route can be determined more quickly.

Moreover, on the basis of on the sensing data that has been received, the route search unit 33b may search for a route from the branch point with the travel route to the destination, the route including a road having a road width through which the UGV 1 to pass, and determine the route that has been searched for to be the different route. In determining such different route, a road having a road width equal to or larger than the width of the UGV 1 identified by the width information or the type information of the UGV 1 is preferably selected. Moreover, in a case where a plurality of different routes (candidates) is searched for (that is, in a case where there is a plurality of routes on which the UGV 1 can travel), the route search unit 33b may determine the optimum route (for example, the route with the shortest distance or the route with the shortest time required) to the destination of the UGV 1 among the plurality of different routes (candidates) to be the different route.

Then, the UGV control unit 33a controls travel of the UGV 1 according to the different route searched for by the route search unit 33b. As a result, it is possible to reduce the time for the UGV 1 to turn back on the road on which the UGV 1 has traveled. For example, the UGV control unit 33a controls travel of the UGV 1 by transmitting, to the UGV 1, travel control information including a control command for the UGV 1 to travel toward the destination along the different route. In contrast, in a case where it is determined that the UGV 1 can travel on the travel route, the UGV control unit 33a may control travel of the UGV 1 by transmitting to the UGV 1 travel control information including a control command to maintain the travel route and travel (that is, to travel on the travel route as planned).

Incidentally, when the sensing data obtained by the UAV 2 having flown away from the UGV 1 sensing the sensing region is received by the communication unit 31, the UAV control unit 33c causes the UAV 2 to return to the UGV 1 by transmitting to the UAV 2 flight control information including a control command for the UAV 2 to return to the UGV 1. As a result, it is possible to prevent the UAV 2 from flying more than necessary, and thus, it is possible to reduce power consumption of the UAV 2. The return method may be specified by the control command to return to the UGV 1. As described above, examples of the return method include (i) causing the UAV 2 to fly back to the UGV 1, (ii) causing the UAV 2 to fly to the next set merging point, and (iii) causing the UAV 2 to hover on the spot.

Here, the UAV control unit 33c may determine any one of the return methods (i) to (iii) on the basis of, for example, the distance between the UGV 1 and the UAV 2 and the remaining battery level indicated in the remaining battery level information of the UAV 2. For example, in a case where the distance between the UGV 1 and the UAV 2 is long (for example, the distance is a threshold or more) and the remaining battery level is low (for example, the remaining battery level is equal to or less than a threshold), the return method of (iii) causing the UAV 2 to hover on the spot is preferably determined. Alternatively, in a case where the distance between the UGV 1 and the UAV 2 is short or in a case where the remaining battery level is high, the return method of (i) causing the UAV 2 to fly back to the UGV 1 or (ii) causing the UAV 2 fly to the next set merging point is preferably determined.

2. Operation of Travel Control System S

Next, operation of the travel control system S will be described separately in Examples 1 to 3. In the following operation examples, cases of delivering a cargo will be described as examples. Incidentally, in the operation of the travel control system S, the management server 3 manages the ground vehicle ID of the UGV 1 that delivers the cargo and the aerial vehicle ID of the UAV 2 that senses the sensing region in association with each other. It is assumed that the UGV 1 sequentially transmits own position information and the ground vehicle ID to the management server 3 during traveling, and it is assumed that the UAV 2 sequentially transmits own position information and the aerial vehicle ID to the management server 3 during flight.

Example 1

Figure 7:
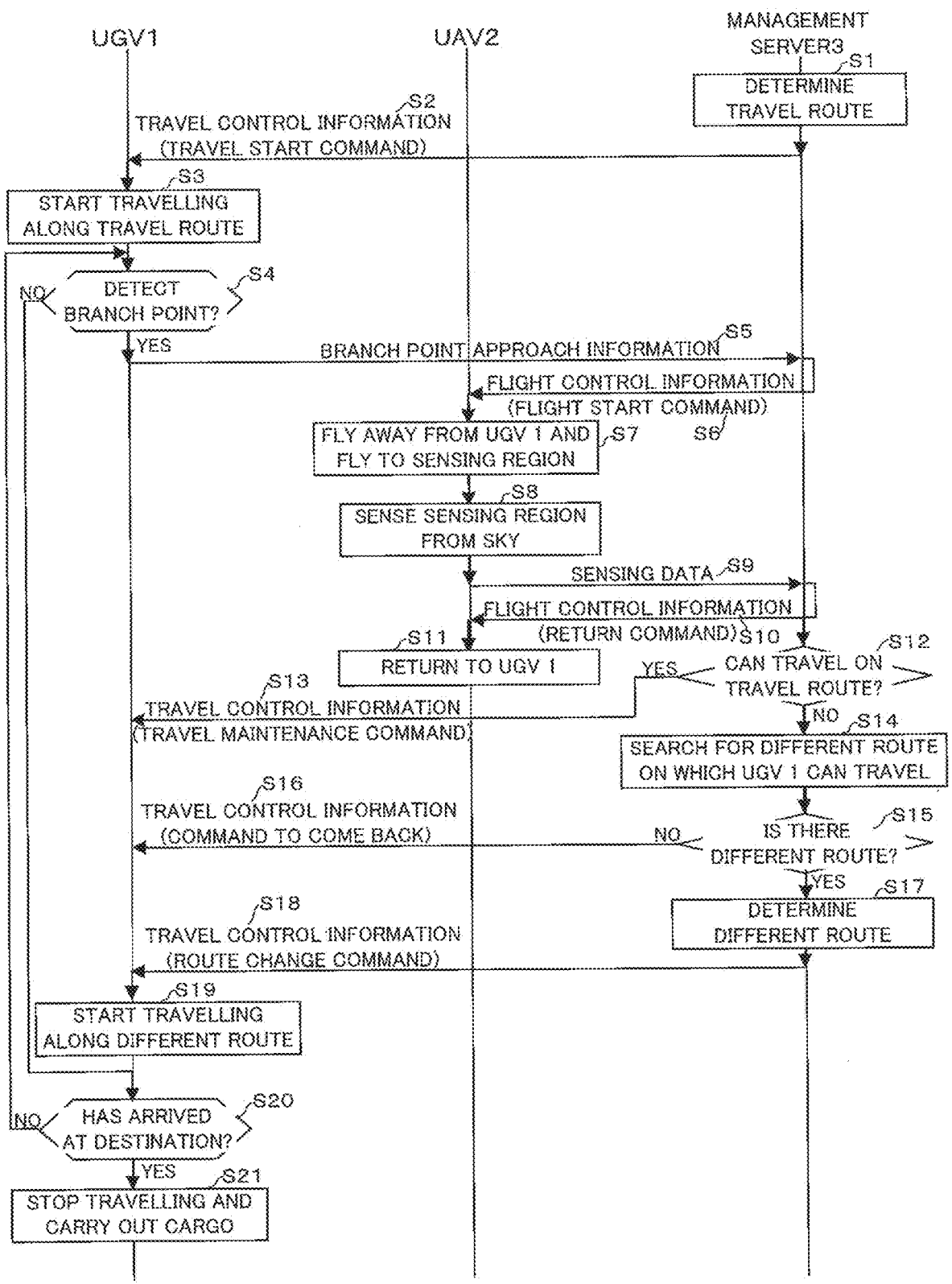
FIG. 7 is a sequence diagram illustrating an example of processing executed among the UGV 1, the UAV 2, and the management server 3 in Example 1.

First, Example 1 of the operation of the travel control system S will be described with reference to FIG. 7. Example 1 is an example in which the UAV 2 is caused to fly away from the UGV 1 at a timing when the UGV 1 approaches the branch point between the travel route and the different route, and to sense the sensing region from the sky. FIG. 7 is a sequence diagram illustrating an example of processing executed among the UGV 1, the UAV 2, and the management server 3 in Example 1.

In FIG. 7, the management server 3 determines the travel route from the departure point to the destination (for example, the delivery destination of the cargo) of the UGV 1 by using, for example, the map information stored in the storage unit 32 (step S1). Namely, as described above, the travel route searched for by the route search unit 33b is preferably determined. Next, the management server 3 transmits travel control information including a control command (travel start command) for the UGV 1 to travel toward the destination along the travel route that has been determined and a branch point detection execution command to the UGV 1 via the communication network NW (step S2).

Upon receiving the travel control information from the management server 3, the UGV 1 starts traveling along the travel route according to the travel control information (step S3). Next, the UGV 1 determines whether or not a branch point between the travel route and the different route has been detected by the sensor unit 13 (step S4). For example, in a case where it is determined that the branch point has been detected by the UGV 1 approaching the branch point (step S4: YES), the UGV 1 transmits the branch point approach information to the management server 3 via the communication network NW (step S5). On the other hand, in a case where it is determined that no branch point between the travel route and the different route has been detected (step S4: NO), the process proceeds to step S20.

Upon receiving the branch point approach information from the UGV 1, the management server 3 transmits flight control information including a control command (sensing and flight start command) for the UAV 2 to fly away from the UGV 1 to the UAV 2 via the communication network NW in order to sense the sensing region from the sky (step S6). Upon receiving the flight control information from the management server 3, the UAV 2 flies away from the UGV 1 and flies to the sensing region (step S7). That is, the UAV 2 flies away from the UGV 1 at a timing when the UGV 1 approaches the branch point between the travel route and the different route. Next, the UAV 2 transmits sensing data obtained by sensing the sensing region from the sky (step S8) to the management server 3 via the communication network NW (step S9). Such sensing data may be continuously transmitted to the management server 3 in time series.

Upon receiving a predetermined amount of sensing data from the UAV 2, the management server 3 transmits flight control information including a control command (return command) for the UAV 2 to return to the UGV 1 to the UAV 2 via the communication network NW (step S10). Here, as described above, the management server 3 preferably determines any one of the return methods (i) to (iii) on the basis of the distance between the UGV 1 and the UAV 2 and the remaining battery level indicated in the remaining battery level information of the UAV 2, and transmits the flight control information including a control command to return by the determined return method to the UAV 2. Incidentally, the flight control information including the control command for the UAV 2 to return to the UGV 1 may be transmitted after the different route has been searched for in step S14. Upon receiving the flight control information from the management server 3, the UAV 2 returns to the UGV 1 (step S11).

Next, the management server 3 determines whether the UGV 1 can travel on the travel route on the basis of the sensing data that has been received (step S12). In a case where it is determined that the UGV 1 can travel on the travel route (step S12: YES), the management server 3 transmits travel control information including a control command (travel maintenance command) to travel while maintaining the travel route to the UGV 1 (step S13). Incidentally, in a case where it is determined that the UGV 1 can travel on the travel route, the travel control information including the travel maintenance command may not be transmitted to the UGV 1.

On the other hand, in a case where it is determined that it is difficult (or impossible) for the UGV 1 to travel on the travel route (step S12: NO), the management server 3 searches for the different route on which the UGV 1 can travel on the basis of the sensing data that has been received (step S14). Here, since the management server 3 recognizes the current position of the UGV 1 on the basis of the position information of the UGV 1, a plurality of different routes (candidates) may be searched for until immediately before the UGV 1 reaches the branch point (for example, several meters before). That is, if the UGV 1 comes immediately before the branch point, search is ended, and the different route is determined in step S17 to be described later from the different route candidates searched for until the end time point of the search. Incidentally, the sensing data for searching for the different route may be sensing data acquired after the sensing data used for determining whether the UGV 1 can travel in step S12.

Next, as a result of the search in step S14, the management server 3 determines whether or not there is the different route on which the UGV 1 can travel (step S15). In a case where it is determined that there is no different route on which the UGV 1 can travel (step S15: NO), the management server 3 transmits travel control information including a control command (command to come back) for the UGV 1 to come back to the UGV 1 via the communication network NW (step S16). Alternatively, in a case where the UGV 1 carries a plurality of cargos, the management server 3 may transmit travel control information including a control command for the UGV 1 to travel to the next delivery destination to the UGV 1 via the communication network NW. Upon receiving the travel control information from the management server 3, the UGV 1 comes back to the departure point, for example. Alternatively, the UGV 1 starts traveling toward the next delivery destination.

On the other hand, in a case where it is determined that there is the different route on which the UGV 1 can travel (step S15: YES), the management server 3 determines (fixes) the different route (step S17). Here, for example, the preliminary route already searched for and stored at the start of travel may be determined to be the different route. Incidentally, in a case where there is a plurality of different routes (candidates), the management server 3 determines the optimum route to the destination of the UGV 1 among the plurality of different routes (candidates) to be the different route. For example, the optimum route on which the UGV 1 can travel is determined among the different routes (candidates) that could have been searched for until immediately before the UGV 1 reaches the branch point. Next, the management server 3 transmits travel control information including a control command (route change command) for the UGV 1 to travel toward the destination along the different route determined in step S17 to the UGV 1 via the communication network NW (step S18).

Upon receiving the travel control information from the management server 3, the UGV 1 starts traveling along the different route according to the travel control information (step S19). As a result, it is possible to reduce the time for the UGV 1 to turn back on the road on which the UGV 1 has traveled. Incidentally, in a case where the travel control information from the management server 3 is not received until the UGV 1 reaches the branch point, the UGV 1 may temporarily stop at the branch point and stand by until the travel control information is received. Next, the UGV 1 determines whether or not the UGV 1 has arrived at the destination (step S20). In a case where it is determined that the UGV 1 has not arrived at the destination (step S20: NO), the process returns to step 54. On the other hand, in a case where it is determined that the UGV 1 has arrived at the destination (step S20: YES), the UGV 1 stops traveling at the destination and carries out the cargo (step S21).

Incidentally, in step S2 described above, the management server 3 may determine whether or not map information used for searching for the travel route satisfies the criterion for newness of the map information. In this case, in a case where it is determined that the criterion is not satisfied, the management server 3 transmits the travel control information including the control command (travel start command) for the UGV 1 to travel toward the destination and the branch point detection execution command to the UGV 1 via the communication network NW. As a result, the above processing is performed. On the other hand, in a case where it is determined that the criterion for is satisfied, the management server 3 transmits travel control information including the control command for the UGV 1 to travel toward the destination but not including the branch point detection execution command to the UGV 1 via the communication network NW. As a result, after starting traveling along the travel route, the UGV 1 travels to the destination without detecting the branch point.

Example 2

Figure 8:
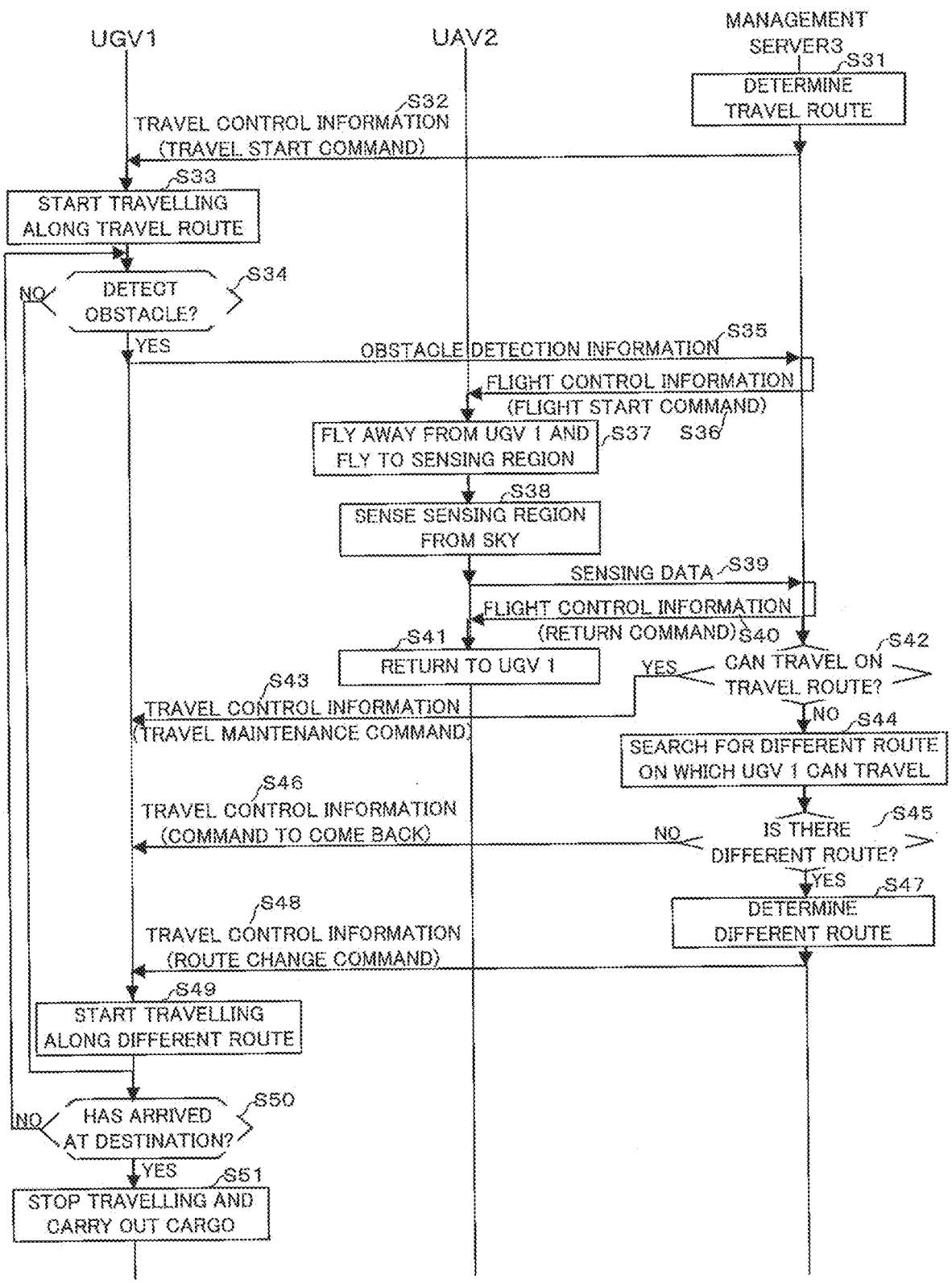
FIG. 8 is a sequence diagram illustrating an example of processing executed among the UGV 1, the UAV 2, and the management server 3 in Example 2.

Next, Example 2 of operation of the travel control system S will be described with reference to FIG. 8. Example 2 is an example in which the UAV 2 is caused to fly away from the UGV 1 at a timing when an obstacle is detected in the traveling direction of the UGV 1 on the travel route, and the sensing region is sensed from the sky. FIG. 8 is a sequence diagram illustrating an example of processing executed among the UGV 1, the UAV 2, and the management server 3 in Example 2.

In FIG. 8, similarly to Example 1, the management server 3 determines the travel route from the departure point to the destination of the UGV 1 by using the map information stored in the storage unit 32 (step S31). Next, the management server 3 transmits travel control information including the control command (travel start command) for the UGV 1 to travel toward the destination along the travel route and the obstacle detection execution command to the UGV 1 via the communication network NW (step S32).

Upon receiving the travel control information from the management server 3, the UGV 1 starts traveling along the travel route according to the travel control information (step S33). Next, the UGV 1 determines whether or not an obstacle has been detected in the traveling direction of the UGV 1 on the travel route (step S34). In a case where it is determined that the obstacle has been detected (step S34: YES), the UGV 1 transmits obstacle detection information to the management server 3 via the communication network NW (step S35). On the other hand, in a case where it is determined that an obstacle has not been detected (step S34: NO), the process proceeds to step S50.

Upon receiving the obstacle detection information from the UGV 1, the management server 3 transmits flight control information including the control command (sensing and flight start command) for the UAV 2 to fly away from the UGV 1 to the UAV 2 via the communication network NW in order to sense, from the sky, the sensing region where the obstacle is present on the travel route (step S36). Upon receiving the flight control information from the management server 3, the UAV 2 flies away from the UGV 1 and flies to the sensing region (step S37). That is, the UAV 2 flies away from the UGV 1 at a timing when the obstacle is detected in the traveling direction of the UGV 1 on the travel route. Incidentally, the processes of steps S38 to S41 illustrated in FIG. 8 are similar to the processes of steps S8 to S11 illustrated in FIG. 7.

Next, the management server 3 determines whether or not the UGV 1 can travel on the travel route on the basis of the sensing data that has been received (step S42). In a case where it is determined that the UGV 1 can travel on the travel route (step S42: YES), the management server 3 transmits travel control information including the control command (travel maintenance command) for the UGV 1 to travel while maintaining the travel route to the UGV 1 (step S43). On the other hand, in a case where it is determined that it is difficult (or impossible) for the UGV 1 to travel on the travel route (step S42: NO), the management server 3 searches for the different route on which the UGV 1 can travel on the basis of the sensing data that has been received (step S44). For example, the management server 3 searches for a branch point in the travel route from the departure point to the point where the obstacle exists, and searches for the different route from the branch point that has been searched for.

Next, as a result of the search in step S44, the management server 3 determines whether or not there is the different route on which the UGV 1 can travel (step S45). In a case where it is determined that there is no different route on which the UGV 1 can travel (step S45: NO), the management server 3 transmits travel control information including the control command (command to come back) for the UGV 1 to come back to the UGV 1 via the communication network NW (step S46). Upon receiving the travel control information from the management server 3, the UGV 1 comes back to the departure point, for example. On the other hand, in a case where it is determined that there is the different route on which the UGV 1 can travel (step S45: YES), the management server 3 determines (fixes) the different route (step S47). Here, for example, the preliminary route already searched for and stored at the start of travel is preferably determined to be the different route. Incidentally, in a case where there is a plurality of different routes (candidates), the management server 3 determines the optimum route to the destination of the UGV 1 among the plurality of different routes (candidates) to be the different route.

Next, the management server 3 transmits travel control information including the control command (route change command) for the UGV 1 to travel toward the destination along the different route determined in step S47 to the UGV 1 via the communication network NW (step S48). Upon receiving the travel control information from the management server 3, the UGV 1 starts traveling along the different route according to the travel control information (step S49). For example, the UGV 1 turns back to the branch point on the travel route on which the UGV 1 has traveled and travels on the different route. Incidentally, the processes of steps S50 to S51 illustrated in FIG. 8 are similar to the processes of steps S20 to S21 illustrated in FIG. 7.

Example 3

Figure 9:
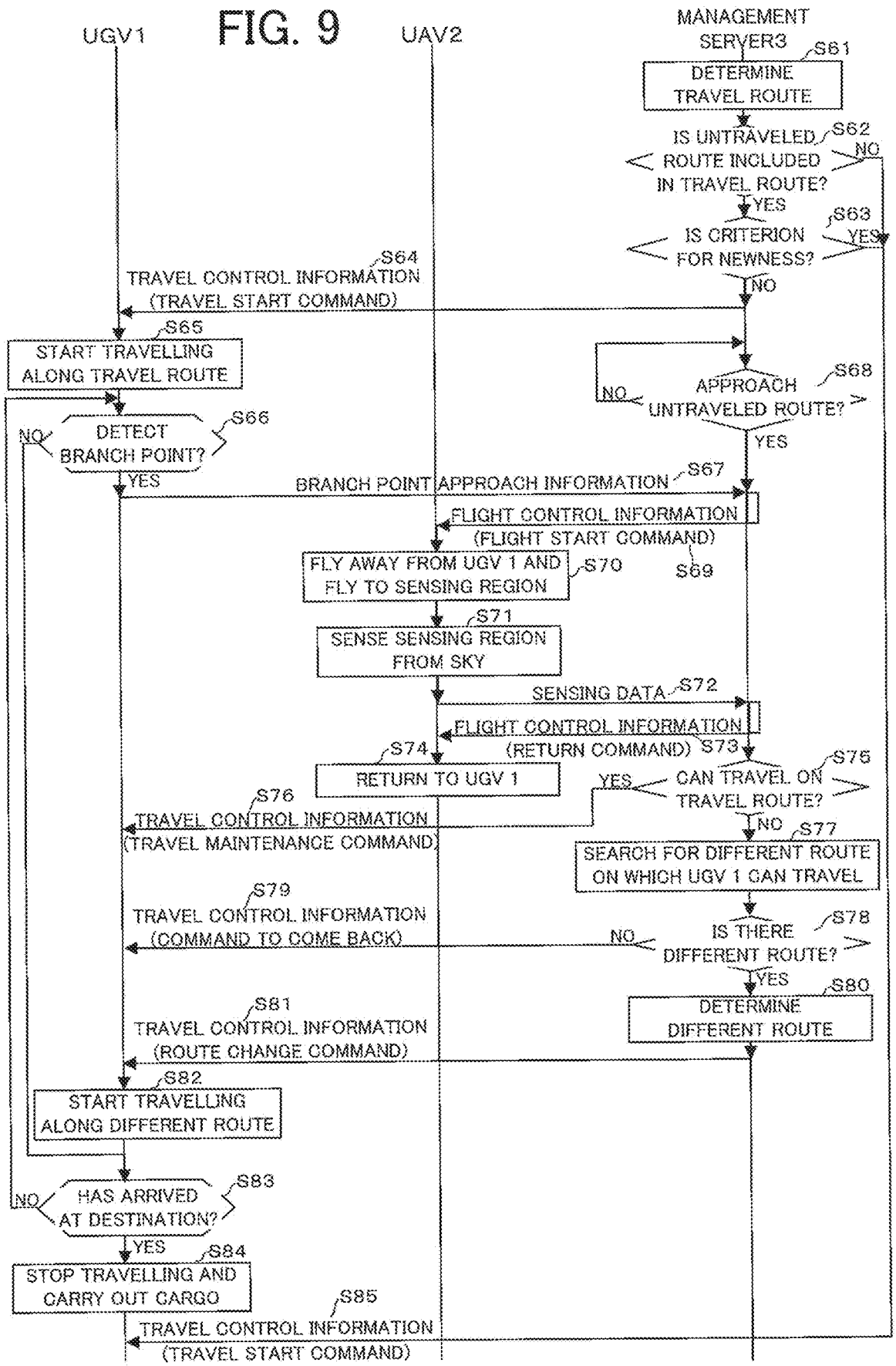
FIG. 9 is a sequence diagram illustrating an example of processing executed among the UGV 1, the UAV 2, and the management server 3 in Example 3.

Next, Example 3 of operation of the travel control system S will be described with reference to FIG. 9. Example 3 is an example in which while the UGV 1 is traveling on the travel route (known travel route), the UAV 2 is caused to fly away from the UGV 1 at a timing of approaching the travel route (untraveled route) on which no other ground vehicle has traveled within a past predetermined period from the current time point, and the sensing region is sensed from the sky. FIG. 9 is a sequence diagram illustrating an example of processing executed among the UGV 1, the UAV 2, and the management server 3 in Example 3.

In FIG. 9, similarly to Example 1, the management server 3 determines the travel route from the departure point to the destination of the UGV 1 by using the map information stored in the storage unit 32 (step S61). Next, on the basis of the travel history information stored in the storage unit 32, the management server 3 determines whether or not the travel route determined in step S61 includes a route (untraveled route) on which no ground vehicle including the UGV 1 has traveled within a past predetermined period from the current time point (step S62).

In a case where it is determined that the travel route includes a route on which no ground vehicle including the UGV 1 has traveled within the past predetermined period from the current time point (step S62: YES), the start point of the untraveled route is stored, and the process proceeds to step S63. On the other hand, in a case where it is determined that the travel route does not include a route on which no ground vehicle including the UGV 1 has traveled in the past predetermined period from the current time point (that is, a ground vehicle has recently traveled on the travel route) (step S62: NO), the process proceeds to step S85.

In step S63, the management server 3 determines whether or not the map information used for searching for the travel route satisfies the criterion for newness of the map information. In a case where it is determined that the criterion for newness of the map information is not satisfied (that is, the map information is old) (step S63: NO), the management server 3 transmits travel control information including a control command (travel start command) for the UGV 1 to travel toward the destination along the travel route and a branch point detection execution command to the UGV 1 via the communication network NW (step S64). On the other hand, in a case where it is determined that the criterion for newness of the map information is satisfied (step S63: YES), the process proceeds to step S85.

Upon receiving the travel control information from the management server 3, the UGV 1 starts traveling along the travel route according to the travel control information (step S65), and determines whether or not a branch point between the travel route and the different route has been detected during travel (step S66). In a case where it is determined that the branch point has been detected by the UGV 1 approaching the branch point (step S66: YES), the UGV 1 transmits branch point approach information to the management server 3 via the communication network NW (step S67). On the other hand, in a case where it is determined that no branch point between the travel route and the different route has been detected (step S66: NO), the process proceeds to step S83.

Upon receiving the branch point approach information from the UGV 1, the management server 3 advances the process to step S69. Moreover, the management server 3 determines whether or not the UGV 1 that is traveling has approached the travel route (untraveled route) on which no other ground vehicle has traveled within the past predetermined period from the current time point (step S68). For example, if the UGV 1 approaches the start point of the untraveled route in the map information used for searching for the travel route, it is determined that the UGV 1 has approached the untraveled route (step S68: YES), and the process proceeds to step S69. On the other hand, in a case where it is determined that the UGV 1 has not approached the untraveled route (step S68: NO), the process of step S68 is repeated. During this time, if the branch point approach information from the UGV 1 is received, the process proceeds to step S69 by an interrupt process.

In step S69, in order to cause the sensing region to be sensed from the sky, the management server 3 transmits flight control information including the control command (sensing and flight start command) for the UAV 2 to fly away from the UGV 1 to the UAV 2 via the communication network NW. Incidentally, the processes of steps S70 to S84 illustrated in FIG. 9 are similar to the processes of steps S7 to S21 illustrated in FIG. 7.

On the other hand, in step S85, the management server 3 transmits travel control information including the control command (travel start command) for the UGV 1 to travel toward the destination but not including the branch point detection execution command to the UGV 1 via the communication network NW. Upon receiving the travel control information from the management server 3, the UGV 1 starts traveling along the travel route according to the travel control information, and in the case of arriving at the destination, the UGV 1 stops traveling at the destination and carries out the cargo. Incidentally, the travel control information transmitted in step S64 or step S85 may include the obstacle detection execution command. In this case, similarly to Example 2, the UGV 1 determines whether or not the obstacle has been detected in the traveling direction of the UGV 1 on the travel route, and in the case of determining that the obstacle has been detected, the UGV 1 transmits obstacle detection information to the management server 3 via the communication network NW.

As described above, according to the above embodiment, the travel control system S causes the UAV 2 to fly away from the UGV 1 on the travel route at the predetermined timing in order to sense the sensing region from the sky, and controls travel of the UGV 1 on the basis of sensing data obtained by sensing the sensing region by the UAV 2 having flown away from the UGV 1. Therefore, travel of the UGV 1 can be appropriately controlled while suppressing power consumption of the UAV 2 used to support travel of the UGV 1.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, an example in which the UGV control unit 33a, the route search unit 33b, and the UAV control unit 33c are provided in the control unit 33 of the management server 3 has been described. However, all or some of the functions of these constituents may be provided in the control unit 15 of the UGV 1 or the control unit 25 of the UAV 2. For example, the control unit 15 of the UGV 1 may cause the UAV 2 to fly away from the UGV 1 at the predetermined timing (for example, the timing of approaching the branch point or a timing at which the obstacle is detected in the traveling direction) by transmitting the above-described flight control information to the UAV 2 by the near field communication function (or via the communication network NW) in order to cause the sensing region to be sensed from the sky.

Alternatively, the control unit 15 of the UGV 1 may transmit the branch point approach information to the UAV 2 by the near field communication function (or via the communication network NW). In this case, the control unit 25 of the UAV 2 causes the UAV 2 to fly away from the UGV 1 when receiving the branch point approach information from the UGV 1 (that is, at the timing when the UGV 1 approaches the branch point). Moreover, the control unit 15 of the UGV 1 may transmit the obstacle detection information to the UAV 2 by the near field communication function (or via the communication network NW). In this case, when receiving the obstacle detection information from the UGV 1 (that is, at the timing when the obstacle is detected), the control unit 25 of the UAV 2 causes the UAV 2 to fly away from the UGV 1.

Moreover, the control unit 25 of the UAV 2 may control travel of the UGV 1 on the basis of sensing data obtained by sensing the sensing region. That is, the control unit 25 of the UAV 2 determines whether or not the UGV 1 can travel on the travel route on the basis of the sensing data, and in the case of determining that it is difficult for the UGV 1 to travel, the control unit 25 searches for the different route on which the UGV 1 can travel in the same manner as the above-described method on the basis of the sensing data, and determines the different route that has been searched for. Similarly to the above in this case, the optimum route may be determined to be the different route from among a plurality of different routes (candidates). Then, the control unit 25 of the UAV 2 controls travel of the UGV 1 by transmitting travel control information including a control command for the UGV 1 to travel toward the destination along the different route that has been determined to the UGV 1 by the near field communication function (or via the communication network NW).

Alternatively, the UAV 2 may transmit the sensing data obtained by sensing the sensing region to the UGV 1 by the near field communication function (or via the communication network NW). In this case, the control unit 15 of the UGV 1 controls travel of the UGV 1 on the basis of the sensing data from the UAV 2. That is, the control unit 15 of the UGV 1 determines whether the UGV 1 can travel on the travel route on the basis of the sensing data, and in the case of determining that it is difficult for the UGV 1 to travel, the control unit 15 searches for the different route on which the UGV 1 can travel in the same manner as the above-described method on the basis of the sensing data, determines the different route that has been searched for, and controls travel of the UGV 1. Similarly to the above in this case, the optimum route may be determined to be the different route from among a plurality of different routes (candidates). Moreover, the control unit 15 of the UGV 1 may cause the UAV 2 to return to the UGV 1 by transmitting to the UAV 2 flight control information including a control command for the UAV 2 to return to the UGV 1 by the near field communication function (or via the communication network NW).

REFERENCE SIGNS LIST

1 UGV
2 UAV
3 Management server
11, 21 Drive unit
12, 22 Radio communication unit
13, 23 Sensor unit
14, 24 Positioning unit
15, 25 Control unit
31 Communication unit
32 Storage unit
33 Control unit
33a UGV control unit
33b Route search unit
33c UAV control unit
S Travel control system

What is claimed is:

1. A travel control system comprising:
an unmanned ground vehicle configured to travel along a route that has been set;
an unmanned aerial vehicle mounted on the unmanned ground vehicle; and
at least one memory configured to store program code; and at least one processor configured to access the program code and operate as instructed by the program code, the program code including:
first control code configured to cause the at least one processor to make the unmanned aerial vehicle fly away from the unmanned ground vehicle on the route at a predetermined timing in order to sense a region including at least part of the route or another route connected to the route from the sky, wherein the predetermined timing is based on a version number of map information of the region being a version number older than a preset version number set as the criterion of newness;
second control code configured to cause the at least one processor to control travel of the unmanned ground vehicle on a basis of sensing data obtained by sensing the region by the unmanned aerial vehicle that has flown away from the unmanned ground vehicle;
third control code configured to cause the at least one processor to select a return method for the unmanned aerial vehicle from a plurality of return methods based on a battery level of the unmanned aerial vehicle, and based on a distance between the unmanned aerial vehicle and the unmanned ground vehicle, wherein the return methods include at least flying back to the unmanned ground vehicle, flying to a point along the route of the unmanned ground vehicle, and hovering in place; and wherein based on the battery level of the unmanned aerial vehicle being below a threshold, and based on the distance between the distance between the unmanned aerial vehicle and unmanned ground vehicle being above a threshold, the third control code is configured to cause the at least one processor to select the return method of hovering in place.

2. The travel control system according to claim 1, wherein the first control code causes the at least one processor to make the unmanned aerial vehicle fly away from the unmanned ground vehicle at the timing when the unmanned ground vehicle approaches a branch point between the route and the other route.

3. The travel control system according to claim 1, wherein the first control code causes the at least one processor to make the unmanned aerial vehicle fly away from the unmanned ground vehicle at the timing when the unmanned ground vehicle approaches a route on which no other ground vehicle has traveled within a past predetermined period from a current time point while the unmanned ground vehicle is traveling on the route.

4. The travel control system according to claim 1, the program code further including first determination code configured to cause the at least one processor to determine whether or not map information used for search for the route satisfies a criterion for determining newness of map information, wherein in a case where it is determined that the criterion is not satisfied, the first control code causes the at least one processor to make the unmanned aerial vehicle fly away from the unmanned ground vehicle at the timing.

5. The travel control system according to claim 1, wherein the first control code causes the at least one processor to make the unmanned aerial vehicle fly away from the unmanned ground vehicle at the timing when an obstacle is detected in a traveling direction of the unmanned ground vehicle on the route.

6. The travel control system according to claim 1, the program code further including second determination code configured to cause the at least one processor to determine whether the unmanned ground vehicle can travel on the route on a basis of the sensing data, wherein the second control code causes the at least one processor to control travel of the unmanned ground vehicle according to a result determined by the at least one processor.

7. The travel control system according to claim 6, the program code further including search code configured to cause the at least one processor to search for the other route on which the unmanned ground vehicle can travel on a basis of the sensing data in a case where it is difficult for the unmanned ground vehicle to travel on the route, wherein the second control code causes the at least one processor to control travel of the unmanned ground vehicle according to the other route searched for.

8. The travel control system according to claim 7, wherein in a case where there is a plurality of the other route on which the unmanned ground vehicle can travel, the search code causes the at least one processor to determine an optimum route to a destination of the unmanned ground vehicle among the plurality of the other route, and the second control code causes the at least one processor to control travel of the unmanned ground vehicle according to the determined optimum route.

9. The travel control system according to claim 1, wherein based on the battery level of the unmanned aerial vehicle being above a threshold, or based on the distance between the distance between the unmanned aerial vehicle and unmanned ground vehicle being below a threshold, the third control code configured to cause the at least one processor to select either the return method of flying back to the unmanned ground vehicle, or the return method of flying to a point along the route of the unmanned ground vehicle.

10. The travel control system according to claim 1, wherein the predetermined timing is when the unmanned ground vehicle is 99 or fewer meters from a branch point on the route, and wherein the region is a region past the branch point.

11. A control method executed by one or more computers in a travel control system including an unmanned ground vehicle configured to travel on a route that has been set and an unmanned aerial vehicle mounted on the unmanned ground vehicle, the control method including:

causing the unmanned aerial vehicle to fly away from the unmanned ground vehicle on the route at a predetermined timing in order to sense a region including at least part of the route or another route connected to the route from the sky, wherein the predetermined timing is based on a version number of map information of the region being a version number older than a preset version number set as the criterion of newness;

controlling travel of the unmanned ground vehicle on a basis of sensing data obtained by sensing the region by the unmanned aerial vehicle that has flown away from the unmanned ground vehicle;

selecting a return method for the unmanned aerial vehicle from a plurality of return methods based on a battery level of the unmanned aerial vehicle, and based on a distance between the unmanned aerial vehicle and the unmanned ground vehicle;

wherein the return methods include at least flying back to the unmanned ground vehicle, flying to a point along the route of the unmanned ground vehicle, and hovering in place; and wherein based on the battery level of the unmanned aerial vehicle being below a threshold, and based on the distance between the distance between the unmanned aerial vehicle and unmanned ground vehicle being above a threshold, the return method of hovering in place is selected.

12. A control device that controls an unmanned ground vehicle configured to travel on a route that has been set and an unmanned aerial vehicle mounted on the unmanned ground vehicle in a travel control system including the unmanned ground vehicle and the unmanned aerial vehicle, the control device comprising:

at least one memory configured to store program code; and at least one processor configured to access the program code and operate as instructed by the program code, the program code including:

first control code configured to cause at least one processor to make the unmanned aerial vehicle fly away from the unmanned ground vehicle on the route at a predetermined timing in order to sense a region including at least part of the route or another route connected to the route from the sky, wherein the predetermined timing is based on a version number of map information of the region being a version number older than a preset version number set as the criterion of newness;

second control code configured to cause at least one processor to control travel of the unmanned ground vehicle on a basis of sensing data obtained by sensing the region by the unmanned aerial vehicle that has flown away from the unmanned ground vehicle; and third control code configured to cause the at least one processor to select a return method for the unmanned aerial vehicle from a plurality of return methods based on a battery level of the unmanned aerial vehicle, and based on a distance between the unmanned aerial vehicle and the unmanned ground vehicle;

wherein the return methods include at least flying back to the unmanned ground vehicle, flying to a point along the route of the unmanned ground vehicle, and hovering in place; and wherein based on the battery level of the unmanned aerial vehicle being below a threshold, and based on the distance between the distance between the unmanned aerial vehicle and unmanned ground vehicle being above a threshold, the third control code is configured to cause the at least one processor to select the return method of hovering in place.

13. A control device that controls an unmanned ground vehicle configured to travel on a route that has been set and an unmanned aerial vehicle mounted on the unmanned ground vehicle in a travel control system including the unmanned ground vehicle and the unmanned aerial vehicle, the control device comprising:

at least one memory configured to store program code; and at least one processor configured to access the program code and operate as instructed by the program code, the program code including:

first control code configured to cause at least one processor to make the unmanned aerial vehicle fly away from the unmanned ground vehicle on the route at a predetermined timing in order to sense a region including at least part of the route or another route connected to the route from the sky, wherein the predetermined timing is based on a version number of map information of the region being a version number older than a preset version number set as the criterion of newness;

second control code configured to cause at least one processor to control travel of the unmanned ground vehicle on a basis of sensing data obtained by sensing the region by the unmanned aerial vehicle that has flown away from the unmanned ground vehicle; and third control code configured to cause the at least one processor to select a return method for the unmanned aerial vehicle from a plurality of return methods based on a battery level of the unmanned aerial vehicle, and based on a distance between the unmanned aerial vehicle and the unmanned ground vehicle; and wherein based on the battery level of the unmanned aerial vehicle being below a threshold, and based on the distance between the distance between the unmanned aerial vehicle and unmanned ground vehicle being above a threshold, the third control code is configured to cause the at least one processor to select any one return method among a first return method of flying back to the unmanned ground vehicle, a second return method of flying to a point along the route of the unmanned ground vehicle, and a third return method of hovering in place.

14. A control method executed by one or more computers in a travel control system including an unmanned ground vehicle configured to travel on a route that has been set and an unmanned aerial vehicle mounted on the unmanned ground vehicle, the control method including:

causing the unmanned aerial vehicle to fly away from the unmanned ground vehicle on the route at a predetermined timing in order to sense a region including at least part of the route or another route connected to the route from the sky, wherein the predetermined timing is based on a version number of map information of the region being a version number older than a preset version number set as the criterion of newness;

controlling travel of the unmanned ground vehicle on a basis of sensing data obtained by sensing the region by the unmanned aerial vehicle that has flown away from the unmanned ground vehicle; and selecting a return method for the unmanned aerial vehicle from a plurality of return methods based on a battery level of the unmanned aerial vehicle, and based on a distance between the unmanned aerial vehicle and the unmanned ground vehicle; and wherein based on the battery level of the unmanned aerial vehicle being below a threshold, and based on the distance between the distance between the unmanned aerial vehicle and unmanned ground vehicle being above a threshold, any one return method is selected among a first return method of flying back to the unmanned ground vehicle, a second return method of flying to a point along the route of the unmanned ground vehicle, and a third return method of hovering in place.

* * * * *